United States Patent
Peirce

(10) Patent No.: US 8,844,047 B2
(45) Date of Patent: Sep. 23, 2014

(54) SECURE PROGRAMMING OF VEHICLE MODULES

(75) Inventor: Kenneth L. Peirce, Grosse Pointe Farms, MI (US)

(73) Assignee: General Motors LLC, Detroit, MI (US)

(*) Notice: Subject to any disclaimer, the term of this patent is extended or adjusted under 35 U.S.C. 154(b) by 411 days.

(21) Appl. No.: 12/636,131

(22) Filed: Dec. 11, 2009

(65) Prior Publication Data

US 2011/0145925 A1   Jun. 16, 2011

(51) Int. Cl.
*G06F 21/00* (2013.01)
*H04L 9/32* (2006.01)
*G06F 21/57* (2013.01)
*G06F 21/34* (2013.01)
*H04L 29/06* (2006.01)

(52) U.S. Cl.
CPC ........ *G06F 21/34* (2013.01); *G06F 2221/2153* (2013.01); *H04L 9/3247* (2013.01); *H04L 63/123* (2013.01); *H04L 2209/80* (2013.01); *H04L 63/0823* (2013.01); *G06F 2221/2143* (2013.01); *G06F 21/572* (2013.01); *H04L 63/062* (2013.01); *H04L 2209/84* (2013.01)
USPC .................. 726/26; 726/27; 726/28; 726/29; 726/30

(58) Field of Classification Search
USPC .................................................. 726/26–30
See application file for complete search history.

(56) References Cited

U.S. PATENT DOCUMENTS

| | | | |
|---|---|---|---|
| 2003/0007640 A1* | 1/2003 | Harada et al. ................. | 380/270 |
| 2005/0100166 A1* | 5/2005 | Smetters et al. .............. | 380/277 |
| 2008/0320471 A1* | 12/2008 | Maeda .......................... | 717/178 |
| 2009/0158397 A1* | 6/2009 | Herzog et al. ..................... | 726/4 |
| 2010/0211436 A1* | 8/2010 | Checketts et al. .............. | 705/10 |
| 2011/0247075 A1* | 10/2011 | Mykland et al. ................ | 726/26 |

* cited by examiner

Primary Examiner — Ghazal Shehni
(74) Attorney, Agent, or Firm — Anthony Luke Simon; Reising Ethington P.C.

(57) ABSTRACT

A method for programming a vehicle module via a secure programming system. The method carried out by the system involves generating a credentials media containing one or more secure credentials. Then, a credentials programmer programs one or more vehicle modules using the credentials media. During each stage of the vehicle module programming, the programming status is securely updated in the credential media. In case of a programming failure, the credentials media is used in a secondary credentials programmer to program the vehicle modules.

20 Claims, 3 Drawing Sheets

SECURE PROGRAMMING OF VEHICLE MODULES

TECHNICAL FIELD

The present invention generally relates to vehicle module programming and, more particularly, to methods for securely programming of vehicle modules.

BACKGROUND

When programming a multitude of vehicle modules (e.g., thousands or millions of such modules) with uniquely identifying parameters, there is always a possibility of programming one or more modules with the same parameters. For example, after a programming system stoppage due to a system failure, a programmer may unintentionally re-start programming of the next vehicle module with a previously programmed vehicle module parameters or at a minimum may not recognize at what stage the programming system stopped. Furthermore, there is always a need to minimize or prevent fraudulent programming of vehicle modules.

SUMMARY OF THE INVENTION

According to one aspect of the invention, there is provided a method for programming a vehicle module. The method comprises the steps of: (a) providing a credentials media containing a plurality of secure credentials; (b) utilizing the credentials media in a credentials programmer to program a plurality of vehicle modules; (c) recording the status of the vehicle module programming in the credentials media; and (d) in case of a programming failure, utilizing the credentials media in a secondary credentials programmer to program a vehicle module.

According to another aspect of the invention, there is provided a method for programming a vehicle module. The method comprises the steps of: (a) providing a credentials media containing a plurality of secure credentials; (b) utilizing the credentials media in a credentials programmer to program a plurality of vehicle modules; (c) updating the status of vehicle module programming each time a vehicle module is programmed with one of the credentials; and (d) in case of a programming failure, utilizing the credentials media in a secondary credentials programmer to program a vehicle module.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

The systems and methods described below are directed to different embodiments of an approach for programming a vehicle module. The disclosed methods provide a programming mechanism which consists of providing a credentials media containing a plurality of secure credentials. Later, a credentials programmer programs a plurality of vehicle modules using the credentials media. During each stage of the vehicle module programming, the programming status is securely updated in the credential media. In case of a programming failure, the credentials media is used in a secondary credentials programmer to program the vehicle modules. This approach allows the system to securely track the status of vehicle module programming so if there is a failure requiring use of a different programming computer, the credentials media can be easily moved to another computer to continue programming without risk of skipping or duplicating any particular set of credentials from the media.

Figure 1:
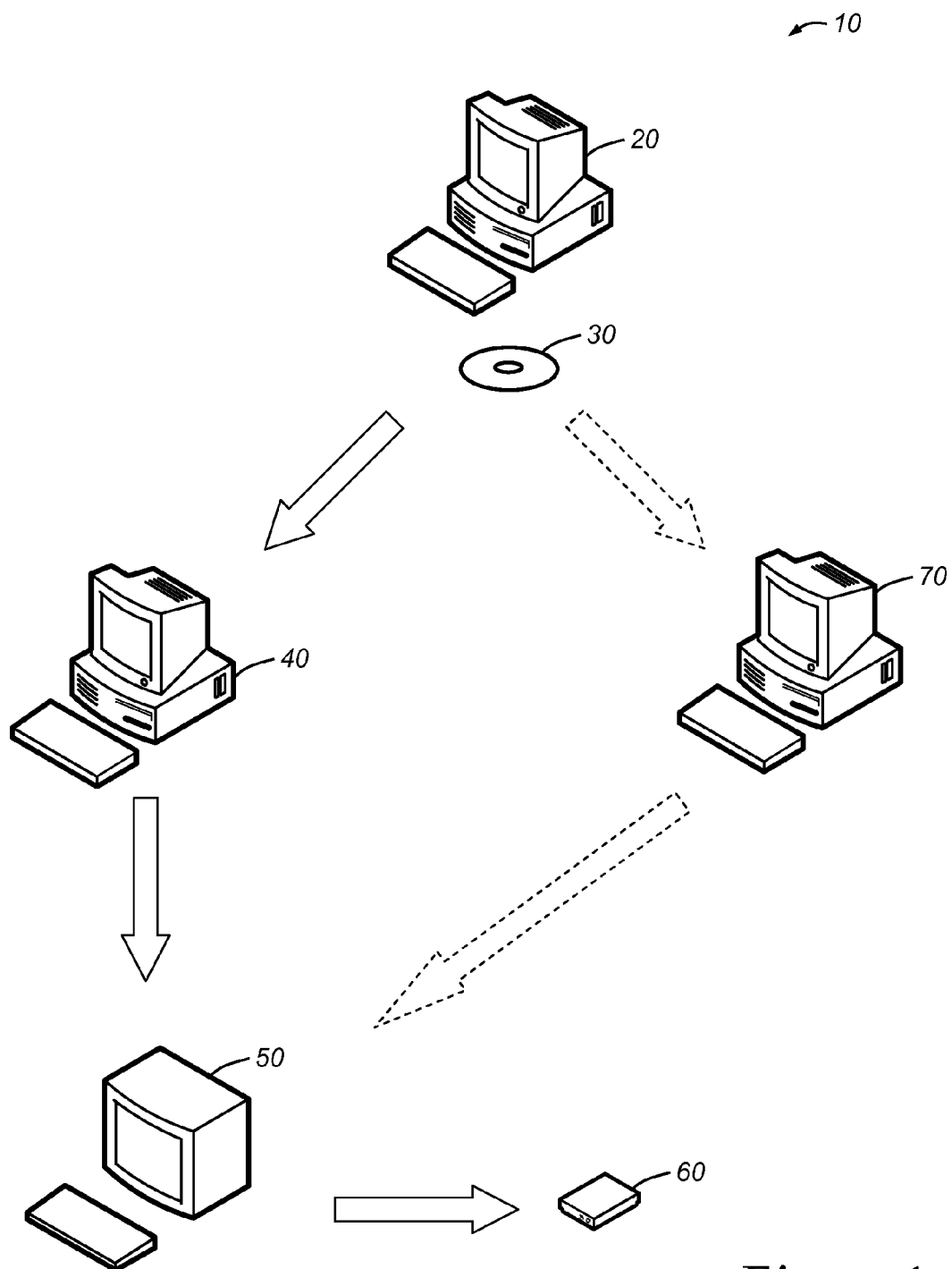
FIG. 1 is a block diagram depicting an exemplary embodiment of a programming system that is capable of utilizing the method disclosed herein.

With reference to FIG. 1, there is shown an exemplary programming system 10 that can be used to implement the methods disclosed herein. Programming system 10 generally includes a credentials generator 20, a credentials media 30, a credentials programmer 40, one or more auxiliary programmers 50, one or more vehicle modules 60, and a secondary programmer 70. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed methods as well.

Credentials generator 20 can be one of a number of computers accessible via a private or public network such as the Internet. It can be used for one or more purposes, such as generating credentials media 30. It can be implemented using any suitable type of computer (e.g., a desktop computer or portable computer) that stores any cryptographic tool including cryptographic application programming interface. Apart from a computer, other types of credentials generators 20 can be used. For example, a third party credentials authority can be used to generate credentials media 30.

Credentials media 30 is a computer-readable medium and can be any of a number of different storage media. Its main uses are storage and ability to be updated by credentials programmer 40 or others. A list of possible credentials media 30 includes digital versatile disc (DVD) (e.g., DVD-RW, DVD+RW, DVD-RAM), high definition media (e.g., Blu-ray, HD DVD), compact disc (CD) (e.g., CD-RW), universal serial bus (USB) (e.g., USB flash drive), memory card (e.g., secure card), external hard disk, data tape, floppy disk, etc. The above list is by no means an exhaustive list of all of the possible credentials media 30, but it is simply provides few examples of credentials media 30 as others will become more evident to skilled artisans.

Credentials programmer 40 can be any type of device capable of reading and updating media 30 and processing electronic instructions including computers, microprocessors, microcontrollers, host processors, controllers, and application specific integrated circuits (ASICs). It may also be referred to as an injector in the sense that it is used to inject credentials into the system for use in programming a vehicle module. It can be a dedicated programmer used only for vehicle modules 60 or can be used with other vehicle systems. Credentials programmer 40 executes various types of digitally-stored instructions, such as software or firmware programs stored in it, which enable vehicle modules 60 to be programmed. For instance, credentials programmer 40 can communicate with auxiliary programmer 50 and may execute programs or process data to carry out at least a part of the method discussed herein.

Auxiliary programmer 50 can be any type of device capable of programming vehicle module 60. It can be operated automatically by credentials programmer 40, by digitally-stored instructions within programmer 50, etc. It can be also operated by an operator and in this case can take the form, for example, of a computer terminal or interface that runs a programming application. Auxiliary programmer 50 can be connected to module 60 through a communication cable (e.g., serial, USB, Ethernet, etc.) or wirelessly. Other options are possible, for instance, in one embodiment, module 60 can be housed inside auxiliary programmer 50 while it is being programmed.

Vehicle module 60 includes any vehicle module that is located throughout a vehicle. As examples, one vehicle module can be a telematics unit that enables wireless voice and/or data communication over a wireless carrier system and via wireless networking so that the vehicle can communicate with a call center, other telematics-enabled vehicles, or some other entity or device. Another vehicle module can be an engine control module (ECM) that controls various aspects of engine operation such as fuel ignition and ignition timing. Another vehicle module can be a powertrain control module that regulates operation of one or more components of the vehicle powertrain, and another vehicle module can be a body control module that governs various electrical components located throughout the vehicle, like the vehicle's power door locks and headlights. As will be appreciated by those skilled in the art, the above-mentioned vehicle modules are only examples of some of the modules that may be used in system 10 or 100, as numerous others are also possible. Furthermore, it should be understood that at least some of the aforementioned modules could be implemented in the form of software instructions saved inside a vehicle (not shown), they could be hardware components located inside the vehicle or a vehicle module (e.g., chip, EEPROM, flash, PAL, etc.), to cite but a few possibilities.

Figure 2:
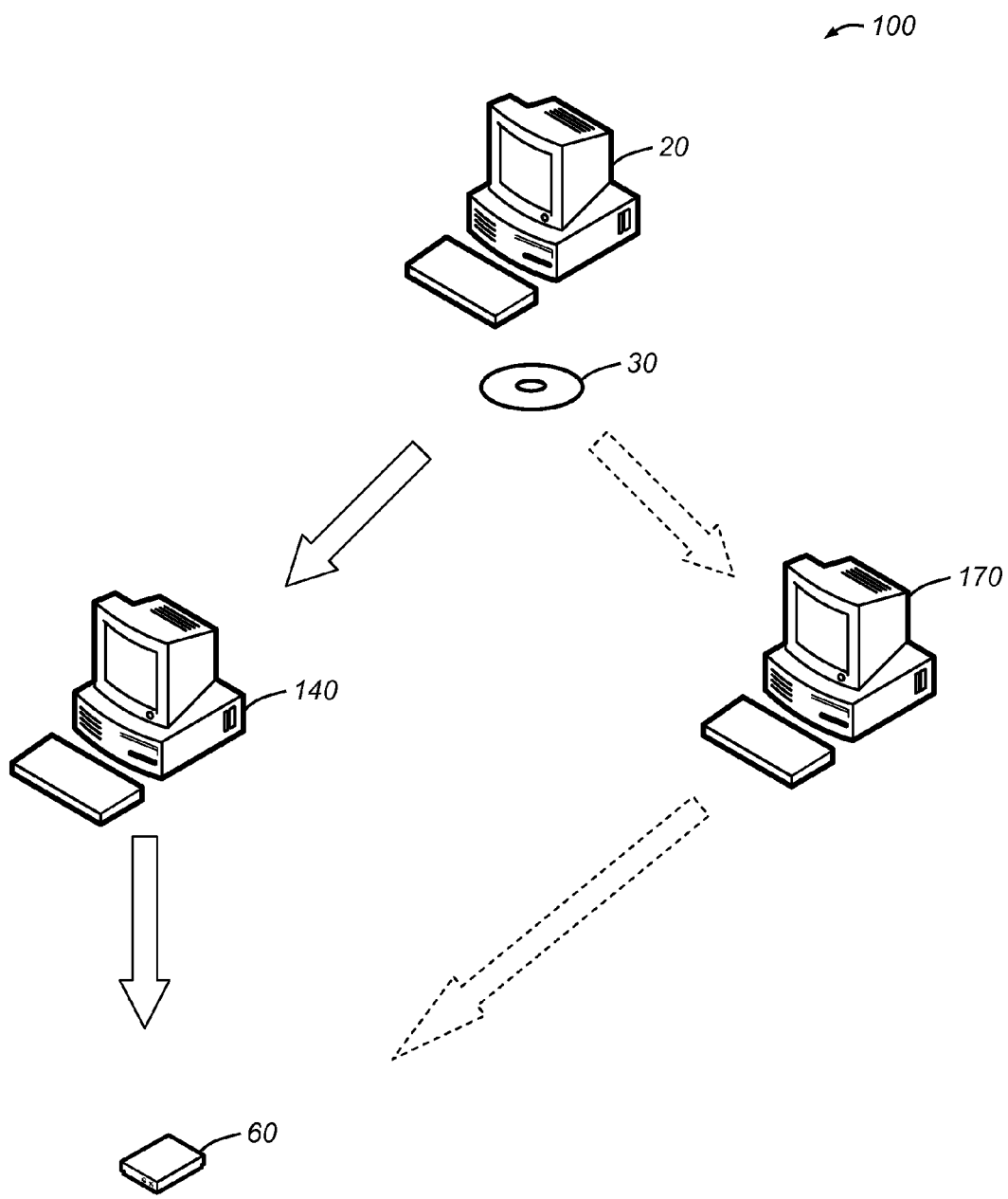
FIG. 2 is a block diagram depicting a second exemplary embodiment of a programming system that is capable of utilizing the method disclosed herein.

FIG. 2 shows a second exemplary programming system 100 that can be used to implement the methods disclosed herein. Programming system 100 generally includes credentials generator 20, credentials media 30, a credentials programmer 140, one or more vehicle modules 60, and a secondary programmer 170. System 100 is similar to system 10 with the exception that programmer 140 of system 100 combines both programmers 40 and 50 of system 10. Similarly, secondary programmer 170 of system 100 combines both programmers 50 and 70 of system 10. Hence, module 60 is programmed directly through either programmer 140 or 170 in system 100.

Figure 3:
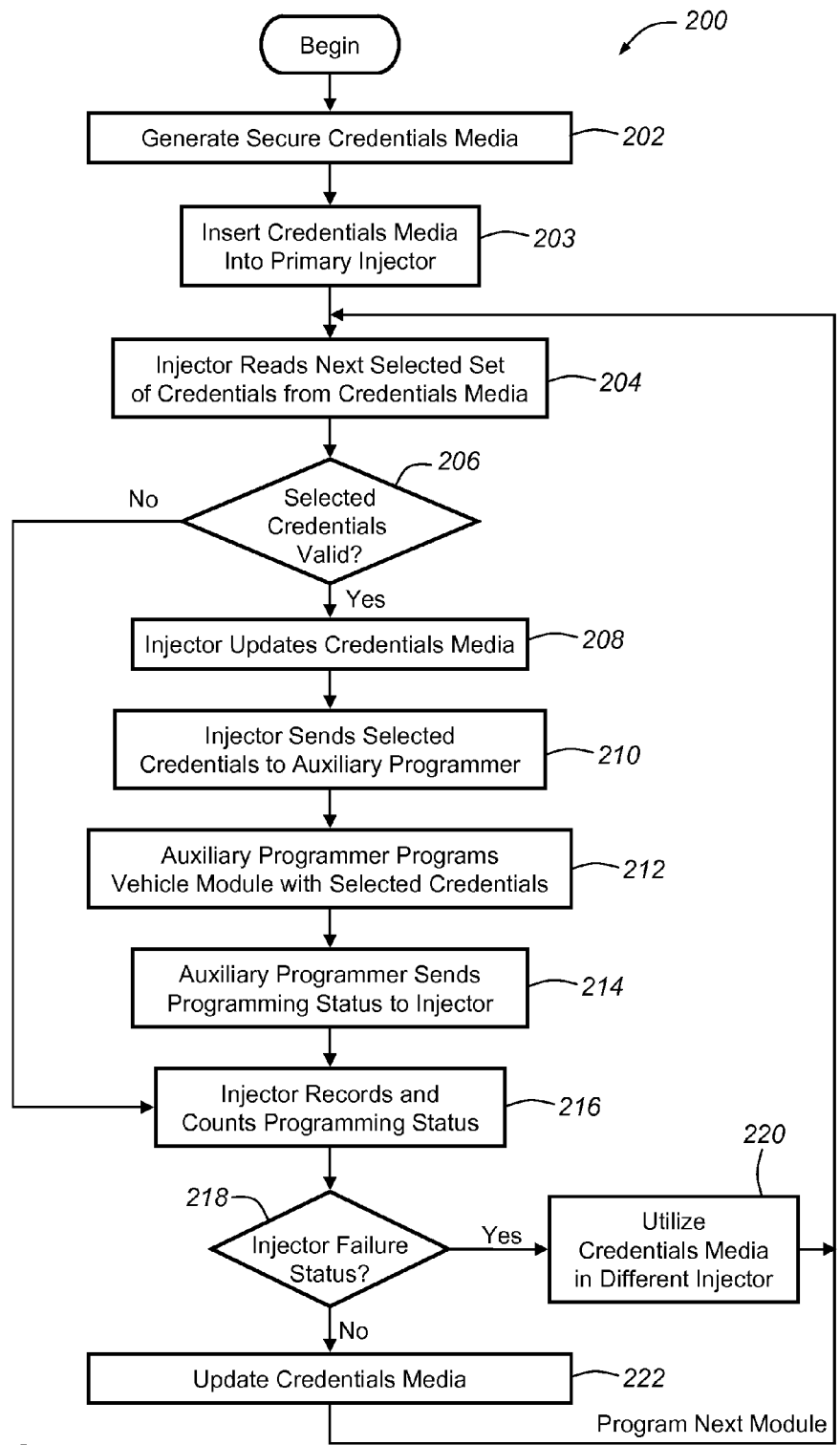
FIG. 3 is a flowchart depicting one embodiment of a method of securely programming a vehicle module.

Turning now to FIG. 3, there is shown a method 200 for programming a vehicle module. The method 200 starts at step 202 and begins by generating the secure credentials media 30. There are several options to generate the credentials media 30 including in-house, third party generation, or any combination of these. In one embodiment, media 30 is generated in-house by an original equipment manufacturer (OEM) automotive company or supplier using any suitable cryptographic tool including a cryptographic application programming interface. In a second embodiment, media 30 is generated by a third party including an application service provider, managed service provider, etc. In either case, one or more cryptography techniques can be used including, public key cryptography (e.g., asymmetric public key-private key, symmetric private key, etc.), strong authentication, one or more factors authentication (i.e., at least a factor or a combination from "something you know", "something you have", and "something you are") (e.g., one factor, two-factor authentication (T-FA), etc.), or others. A list of factors that can be used includes tokens (e.g., virtual and/or physical tokens), smart cards, USB, biometrics, magnetic cards, phones, SMS, passwords, etc. Therefore, in addition to generating media 30 with/without its own embedded security factors, one or more additional factors can be also generated. In one embodiment, media 30 is generated with software or firmware prompting a user to type a password, or use biometric data. In another embodiment, media 30 is generated in conjunction with a USB drive that is necessary to operate media 30. Skilled artisans will appreciate that other techniques can be used. The credentials generated include digital certificate, one or more keys (e.g., private key, public key, etc.), phone numbers (e.g., cellular numbers), identifiers (e.g., module serial number, vehicle identification number (VIN)), etc. This collection of credentials can be logically related and grouped in one or more tables or any other formats contained in one or more files and consolidated in one or more databases. For instance, in one embodiment the data can be related as a separate set of credentials for each separate module (e.g., digital certificate, security keys, phone number, VIN, etc.). In a second embodiment, the data can be related as sets of similar data type (e.g., set-1 list of digital certificates, set 2-list of security keys, set 3-list of phone numbers, set 4-list of VINs, etc.).

Once generated, the credentials media 30 is inserted into the primary injector 40, as indicated at step 203. Next, primary injector 40 reads a (next) selected set of credentials from the credentials media 30 per step 204. The set of credentials includes any data to be programmed in a vehicle module 60. In addition, it may include the necessary security data to preserve the security aspect of the process. In one embodiment, the set of credentials contains a key certificate (e.g., X.509), a private key, a shared key, a phone number, and a serial number. In method 200, the next time the process loops back to step 204, the next set of credentials will be read from credential media 204.

At step 206, the selected credentials validity is checked. In one embodiment, primary injector 40 can check the credentials validity. One or more checks can be performed here including wholeness (i.e., does the set include all the credentials?), accuracy (e.g., is each credential complete and has all of its alphanumeric digits?), unique (e.g., is the appropriate credential unique and not used before?), and/or other checks. This can involve use of one or more digital certificates to ensure confidentiality and/or authenticity of the credentials. In case the credentials are valid, method 200 proceeds to step 208. However, if the credentials are not valid then method 200 proceeds to step 216. Both steps will be described below.

If the selected credentials are valid, at step 208, primary injector 40 updates the credential media 30. At this step, method 200 keeps track of which set of credentials are in use. Hence, if the process stops at this step, a user will recognize efficiently and in a timely fashion which set of credentials to use next. In addition, keeping track of which set of credentials are in use will provide transparency of the process and its performance. This tracking of the current credentials can be done via an acknowledgement written to the credentials media 30; for example, by writing to the media 30 (e.g., in a separate file) the set of selected credentials currently being used (or a unique identifier thereof). This acknowledgement can also include a list of all the credentials used thus far. Primary injector 40 can also digitally sign the acknowledgement using a message authentication code (MAC) including a keyed-hashed message authentication code (HMAC or KHMAC) such as HMAC-MD (e.g., MD4, MD5, etc.), HMAC-SHA (e.g., SHA-0, SHA-1, SHA-2, SHA-3, etc.), or others. In one embodiment, primary injector 40 digitally signs the acknowledgement that the selected set of credentials is being used using HMAC-SHA-256. A person skilled in the art will recognize that other message authentication codes can be used.

Later, primary injector 40 sends the selected credentials to auxiliary programmer 50 (step 210). The credentials can be sent automatically from injector 40 through a network to auxiliary programmer 50 or an operator may perform this task by providing a command through injector 40 to send the credentials to auxiliary programmer 50. Then, auxiliary programmer 50 programs module 60 with the selected credentials per step 212. During this step and any other steps, even though the discussion involves only one module and one auxiliary programmer, however, a plurality of modules and auxiliary modules may be used. In one embodiment, several auxiliary programmers are used, however, each auxiliary programmer programs only one module at a time. In a second embodiment, one auxiliary programmer programs several modules at a time. These are only few options as others are possible. There are several programming strategies that can be employed. In one embodiment, auxiliary programmer 50 tries to program module 60 one time and does not depend on the outcome of module 60 programming status, then, later method 200 proceeds to the next step 214. In another embodiment, auxiliary programmer 50 may try to program module 60 several times if it notices a programming failure (e.g., one or more credentials not programmed) before method 200 proceeds to the next step 214. The programming period can be limited by a period of time where several trials are performed in case of a programming failure until a certain period of time expires. In another embodiment, the programming period is limited by the number of programming trials in case of a programming failure. These are only few examples as others are possible, for example, a combination of a number of trials and maximum programming time period can be used.

Next, auxiliary programmer 50 sends a programming status to primary injector 40 per step 214. The status can be either pass or fail status. The pass status can be established if module 60 programming is successful. The fail status can be established if module 60 programming is determined to be unsuccessful. Among other things, this step provides method 200 with process transparency so a user or others can easily monitor, evaluate, correct and/or improve system 10.

At step 216, primary injector 40 records and counts module 60 programming status. At this stage, injector 40 records and counts module 60 programming status received from auxiliary programmer 50 (e.g., number of passes, number of failures, etc.). In addition, it records and counts the credentials invalid status per step 206. Recording of successful programming (pass status) can be done by securely writing to the credentials media 30 either the actual credentials just successfully programmed, or a unique indicator of that, and/or a list of all the credentials programmed successfully thus far. And, this confirmation can be signed digitally for authentication.

At step 218, primary injector 40 failure status is checked. The status can be either failure or no failure (success). A failure can be determined by one or more factors including one count of invalid selected credentials returned by primary injector 40, a predetermined number count of invalid selected credentials returned by primary injector 40, primary injector 40 inability to communicate with programmer 50, media 30, or others, etc. The failure status can also comprise a failure status of one or more auxiliary programmers 50 as described earlier. In a case of a failure, method 200 proceeds to step 220 where credentials media 30 is used in a different injector such as injector 70 which will become the main injector and method 200 loops back to step 204 where injector 70 reads next selected set of credentials from credentials media 30. However, if there is no failure status then injector 40 updates credential media that module 60 is programmed successfully and securely signs the communication. Then, method 200 loops back to step 204 where injector 40 reads next selected set of credentials from credentials media 30.

When, at step 220 the system switches to the secondary programmer 70, the credentials media 30 is accessed by that secondary injector which determines the point at which successful programming by the primary injector stopped. Then, the secondary injector can continue with the first set of credentials that were not successfully programmed by the first injector. This process can be carried out automatically through suitable programming of the secondary injector 70. Thus, for example, the secondary injector can read from the media 30 the digitally signed file identifying the last credentials used and, based on that, proceed at the step 204 using the first unused credentials from the media 30.

Method 200 with few modifications can be employed with system 100 illustrated in FIG. 2 and depicting a second exemplary embodiment of a programming system that is capable of programming a vehicle module. In this case, in addition to reading and updating credentials 30, primary injector 140 programs vehicle module 60. Hence, steps 210 and 214 are omitted and step 212 is performed by primary injector 140. In a case of failure, secondary injector 170 will replace injector 140.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for programming a vehicle module, comprising the steps of:
    (a) providing a credentials media containing a plurality of secure credentials;
    (b) programming a plurality of vehicle modules, wherein the programming is carried out by a credentials programmer utilizing the credentials media;
    (c) recording the status of the vehicle module programming in the credentials media using the credentials programmer; and
    (d) in case of a programming failure, programming a vehicle module, wherein the programming is carried out by a second credentials programmer utilizing the credentials media in the secondary credentials programmer.

2. The method of claim 1, wherein the secure credentials include a unique serial number.

3. The method of claim 1, wherein the secure credentials include a cellular telephone number.

4. The method of claim 1, wherein the credentials media is an optical disc storage media comprising a digital versatile disc (DVD), a compact disc (CD), or a high definition disc.

5. The method of claim 1, wherein the credentials media is a universal serial bus (USB) storage media comprising either a flash drive or a hard drive.

6. The method of claim 1, wherein the credentials programmer is a computer programmed to carry out at least steps (b) and (c).

7. The method of claim 1, wherein steps (b) and (c) together further comprise the steps of: i) reading some selected credentials from the credentials media by the credentials programmer, ii) validating the selected credentials, iii) updating the credentials media with an acknowledgement that the selected credentials are being used, iv) sending the selected credentials to an auxiliary programmer, v) programming the vehicle module with the selected credentials using the auxiliary programmer, vi) sending the status of the vehicle module programming to the credentials programmer, and vii) recording the status by updating the credentials media with a confirmation that indicates whether or not the selected credentials were successfully programmed.

8. The method of claim 7, wherein the auxiliary programmer is a computer programmed to carry out at least part of step (b).

9. The method of claim 7, wherein the status of the programmed vehicle module comprises either a success or a failure.

10. The method of claim 7, wherein step (iii) further comprises the step of securely signing the acknowledgement update to the credentials media and wherein step (vii) further comprises the step of securely signing the confirmation update to the credentials media.

11. The method of claim 1, wherein step (c) further comprises updating the status each time a vehicle module is programmed with one of the credentials.

12. The method of claim 1, wherein step (d) further comprises determining if a number of programming failures exceeds a preselected value and if so, using the secondary credentials programmer.

13. The method of claim 1, wherein step (b) further comprises using an auxiliary programmer to program the vehicle modules.

14. A method and a system for programming a vehicle module, comprising the steps of:
(a) providing a credentials media containing a plurality of secure credentials;
(b) programming a plurality of vehicle modules, wherein the programming is carried out by a credentials programmer utilizing the credentials media;
(c) updating the status of vehicle module programming each time a vehicle module is programmed with one of the credentials using the credentials programmer; and
(d) in case of a programming failure, programming the vehicle module, wherein the programming is carried out by a second credentials programmer utilizing the credentials media in the secondary credentials programmer.

15. The method of claim 14, wherein the secure credentials include a unique serial number.

16. The method of claim 14, wherein the secure credentials include a cellular telephone number.

17. The method of claim 14, wherein the credentials media is an optical disc storage media comprising a digital versatile disc (DVD), a compact disc (CD), or a high definition disc.

18. The method of claim 14, wherein the credentials media is a universal serial bus (USB) storage media comprising either a flash drive or a hard drive.

19. The method of claim 14, wherein the credentials programmer is a computer programmed to carry out at least steps (b) and (c).

20. The method of claim 14, wherein step (c) further comprises recording the status of the vehicle module programming in the credentials media.

* * * * *